United States Patent [19]
Geist et al.

[11] 3,708,967
[45] Jan. 9, 1973

[54] ROTARY CUTTING ASSEMBLY

[75] Inventors: Thomas N. Geist; George C. Ballas, both of Houston, Tex. 77027

[73] Assignee: said Ballas, by said Geist

[22] Filed: Dec. 31, 1971

[21] Appl. No.: 207,198

[52] U.S. Cl. .................................... 56/12.7, 56/295
[51] Int. Cl. ............................................. A01d 55/18
[58] Field of Search ...... 56/10.4, 12.7, 229, 249, 255, 56/289, 294, 295, DIG. 17; 30/264, 276, 347; 83/542

[56] References Cited

UNITED STATES PATENTS

| | | | |
|---|---|---|---|
| 2,250,948 | 7/1941 | Garst | 56/12.7 X |
| 2,538,230 | 1/1951 | Boggs | 56/12.7 |
| 2,708,335 | 5/1955 | Newton | 56/12.7 |

Primary Examiner—Russell R. Kinsey
Assistant Examiner—J. A. Oliff
Attorney—Paul E. Harris et al.

[57] ABSTRACT

An improved cutting assembly for rotary lawn mowers, edgers, or the like, including a body member arranged for rotating about an axis normal with the cutting plane. At least one cutting line is attached to the body member for rotation therewith in the cutting plane. The line is characterized by having a working length to diameter ratio and a material composition to render the line substantially limp and nonself-supporting in the static condition. Certain embodiments of the invention may include means for detachably securing the lines to the body member and for storing a supply of the line on the body member so that the line may be paid out as the working portions of the line become shortened through wear. The cutting lines are preferably nonmetallic so as to reduce the hazardous condition which would otherwise be present for the operator and still provide an apparatus which will cut with great efficiency and safety.

10 Claims, 11 Drawing Figures

PATENTED JAN 9 1973

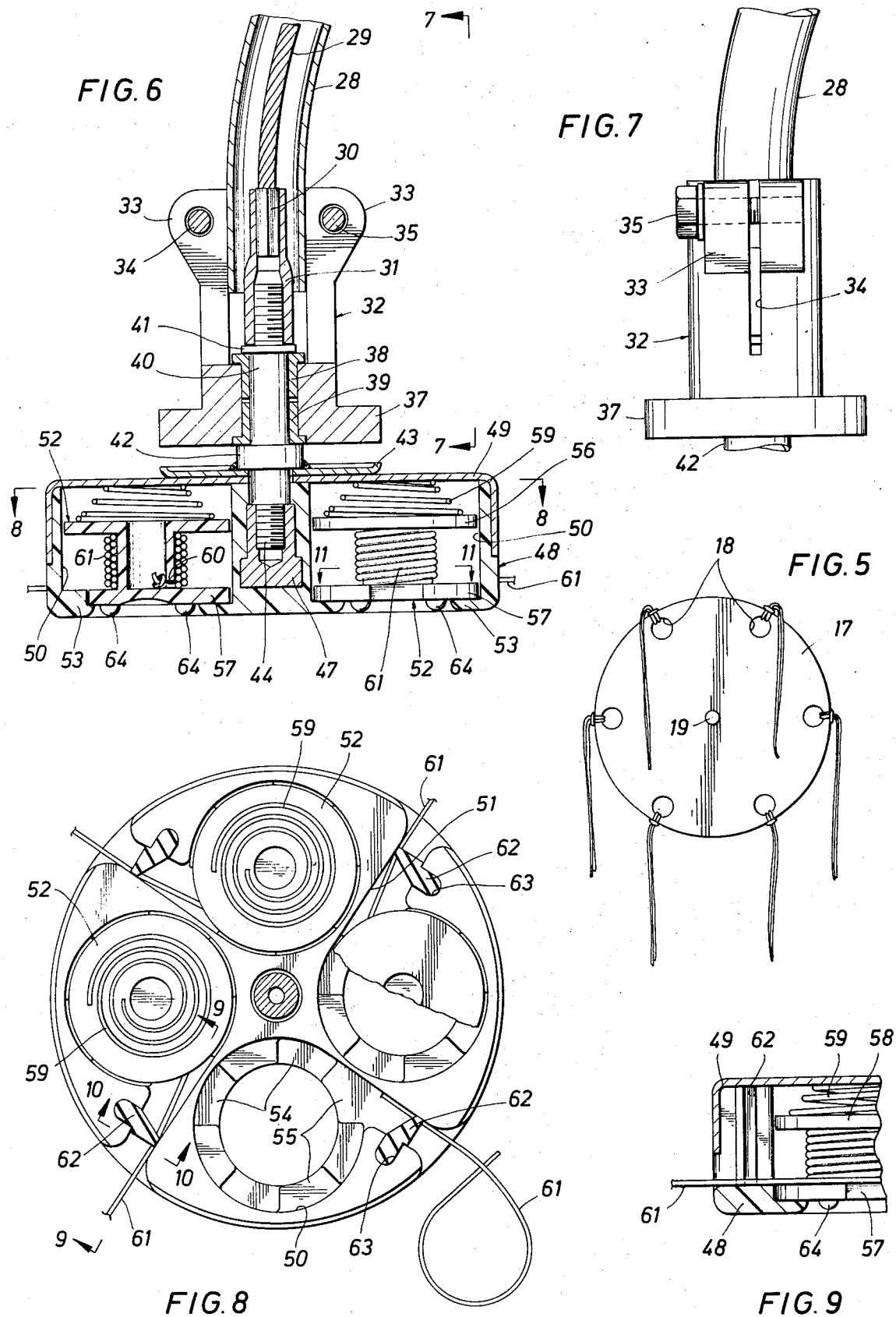

ROTARY CUTTING ASSEMBLY

BACKGROUND OF THE INVENTION

1. Field of the Invention

This invention relates to an improved cutting assembly in the form of a rotary head for a rotary lawn mower, edger, or the like. The preferred embodiments are in the form of portable hand-held type lawn mowing and edging tools wherein the cutting element is safe in most uses and avoids the hazardous conditions created by prior art devices.

2. Description of the Prior Art

The prior art is prolix with attempts at solutions to provide a safe, efficient, and simply constructed rotary head for rotary lawn mowers, edgers, and the like. Heretofore, the rotary head, or cutting blade, of rotary lawn mowers, edgers, and the like, have comprised a rotating metal bar or the like which is rotated at sufficient speeds to effect cutting of grass, weeds, or the like. However, such bars create hazardous conditions in that when they strike certain objects they act upon those objects in a fashion to create and project dangerous missiles which may strike the operator or individuals in the area of work.

Various attempts have been made to overcome the aforesaid hazardous conditions created with rigid type metal cutting blades of the prior art. Most of these attempts to overcome the problem involve the utilization of some type of flexible flail which will have sufficient resiliency so as not to propel objects which are struck at high velocities. Most of these resilient type cutting elements of the prior art suffer a disadvantage in that they are not safe and mere resiliency is not sufficient to insure that the dangerous conditions will not be created when rotation is effected at desired cutting speeds. Further, the prior art cutting elements are generally not provided with means for easily replacability in the event of wearing out and are usually expensive to replace.

The result has been that most of the prior lawn edging apparatus have been unsatisfactory because of the dangerous conditions created by the rotating head. As a consequence, most lawn edging and trimming around trees and the like, which would otherwise be damaged by the metal blades, must be done manually, which is both laborious and time consuming.

It is therefore an object of this invention to provide an improved cutting head or assembly for rotary lawn mowers, edgers, or the like, which will provide a solution to the aforesaid problems and provide a rotating cutting assembly which is safe for use, which eliminates most of the aforesaid manual labor, and which can be operated with a minimum of skill.

SUMMARY OF THE INVENTION

This invention is for an improved cutting assembly for a rotary lawn mower, edger, or the like. It includes a body member arranged for rotation about an axis generally perpendicular with or normal to the cutting plane. It includes at least one nonmetallic cutting line attached to the body member for rotation therewith in the cutting plane. The line is characterized by having an effective working length to diameter ratio and a material composition to render the line substantially limp and nonself-supporting in the static condition. Preferably, the effective working length to diameter ratio of the line is at least 20:1. Certain embodiments of the invention include means for detachably securing the line or lines to the body member so that the same may be replaced after wear. Means may also be included with the body member for storing supplies of line in the nonworking condition whereby the effective working length of the line or lines may be lengthened at determined times as the working length becomes shortened during use thereof. Certain embodiments of the invention may have line storage means supported in the body member, which storage means are in the form of spools which are locked from rotation, but which may be released so that additional line may be paid out as the effective working length becomes shortened during use.

BRIEF DESCRIPTION OF THE DRAWINGS

FIG. 5 is a view similar to FIG. 2 but showing the same cutting assembly in the static or nonrotating position.

FIG. 6 is a central vertical sectional view of an alternative embodiment having means for storing a supply of line which may be paid out at predetermined times to lengthen the effective working length of the cutting lines.

FIG. 7 is a side elevation view along line 7—7 of FIG. 6.

FIG. 8 is a generally cross-sectional view taken along line 8—8 of FIG. 6.

FIG. 9 is a partial sectional view taken along line 9—9 of FIG. 8.

DESCRIPTION OF THE PREFERRED EMBODIMENTS

Figure 1:
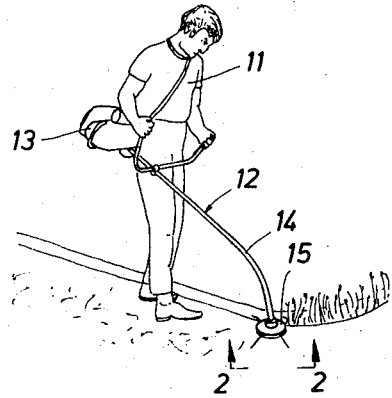
FIG. 1 is a view showing an operator operating one form of portable apparatus with which this invention is adapted for use.

Referring now to FIG. 1, an operator 11 is shown carrying a portable type lawn mowing and edging device generally designated by the numeral 12, having a power means in the form of motor 13 on the rearward end thereof and provided with a forwardly extending casing 14 which supports the cutting element designated by the numeral 15 and which provides rotational movement thereto via a rotary drive shaft inside casing 14. By manipulation of casing 14, the cutting plane of cutting element 15 can be arranged to be either horizontal or vertical and used to cut along sidewalks, around trees and rocks, and along fences and the like where it is difficult or unsafe to cut with conventional devices.

Figure 2:
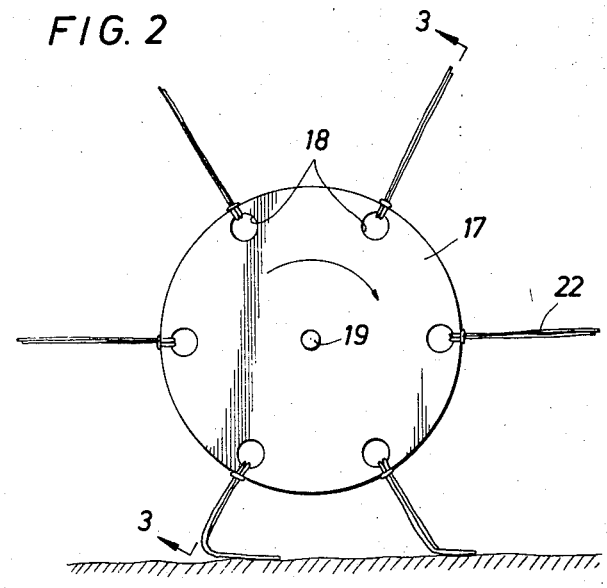
FIG. 2 is a view taken generally along line 2—2 of FIG. 1 showing one embodiment of the cutting assembly of this invention in a dynamic or rotating condition.

One embodiment of a cutting assembly of this invention is shown in FIG. 2 in the dynamic condition. The same assembly is shown in FIG. 5 in the static condition, where it will be observed that lines 22 are substantially limp. This embodiment of the cutting assembly includes a rotatable disc 17 made of plastic or the like and provided with a plurality of means for attaching cutting lines thereto about the periphery thereof, which cutting means take the form of a plurality of disc openings 18 circumferentially spaced about the periphery thereof. In FIG. 2, disc 17 is shown in the dynamic or rotating position with rotation being effected in the direction of the arrow. Disc 17 is provided with a central mounting opening 19 in the center thereof whereby disc 17 may be attached to rotating shaft 20 inside casing 14 as shown in FIG. 3.

Figure 3:
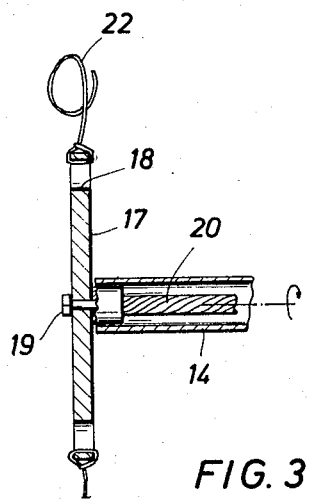
FIG. 3 is a view taken along line 3—3 of FIG. 2 showing additional details of this embodiment of the cutting elements, but being shown in the static or nonrotating condition.
Figure 10:
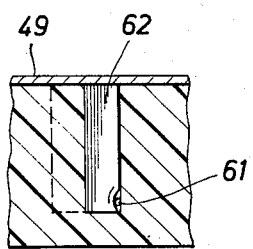
FIG. 10 is a fragmentary sectional view taken along line 10—10 of FIG. 8 showing line retaining means.

Referring now to FIGS. 2 and 3, it will be seen that the cutting elements are in the form of flexible lines designated by the numeral 22 which are looped about disc 17 at each of disc openings 18 and are frictionally held therewith such that each line 22 has two end portions which provide effective cutting lengths. Lines 22 may be removed and replaced simply by unlooping from disc 17. Replacement can be effected by reinstalling lines 22 thereon when the same becomes worn or shortened due to usage.

Cutting lines 22 may be composed of a variety of materials, as for example an elastoplastic extrusion which has been stretched to align the molecules axially. An example of such line is a nylon monofilament such as fishing line. However, other lines may be used, as for example, yarn, cord, rope, twine, braided line, or monofilament, whether described as elastoplastic, elastomeric, natural fiber, or synthetic fiber, and whether compounded of several materials. Nevertheless, there are certain parameters within which the lines must fall in order to be effective.

It is preferably that cutting lines 22 be of a nonmetallic material for reasons of safety. For instance, when metallic lines break they tend to create projectiles during operation of the device which create hazardous operating conditions.

The cutting lines should preferably have sufficient fatigue, abrasion, and impact resistance to allow reasonable service life. Further, the line should have sufficient tensile strength to allow a reasonable service life. The cutting lines should have as small a diameter as is consistent with the foregoing parameters so that the sharpest cutting edge is provided for effecting cutting of the grass, weeds, or the like. The line should preferably be as lightweight as possible so that when the line shears or breaks during use and is thrown from the cutter head, it will cause the least damage upon contact with persons or objects.

It has been determined that a cutting line fitting within the above parameters will have an effective length to diameter ratio and material composition which renders the line essentially or substantially limp and not self-supporting in a static position. This effective length to diameter ratio for the line will usually be greater than 20:1. It is presently thought that best cutting lines for the purposes of this invention are extruded nylon line, such as fishing line, having a diameter of about 0.062 inches for cutting grass and about 0.125 inches for cutting weeds.

Although the aforesaid cutting lines are essentially limp and not self-supporting while in the static condition, as shown in FIG. 5, they become rigid and taut under dynamic conditions of rotation, as shown in FIG. 2. The normal rotating speed is on the order of 3000–4000 rpms. During rotation of the cutting lines in the dynamic condition, the cutting lines are caused to become taut and thereby increase the apparent rigidity of the line. These effects are caused by both the rotational speed and the tip speed of the cutting element.

To provide optimum tip speed, disc 17 is preferably rotated at about 3000–4000 rpms and is preferably about 7 inches in diameter. It is presently thought that the optimum effective working length of lines 22 is about 6½ inches. Further, the effective cutting lengths of cutting lines 22 are preferably in the range of about 3 to about 10 inches, such that at the present time it is thought that the preferable total diameter of disc 17 and cutting lines 22 in the dynamic condition is in the range of 14 to 34 inches. It has also been found that there may be a limit on the number of cutting lines which may be attached to any one disc. If the number is too great, they tend to become tangled.

Figure 4:
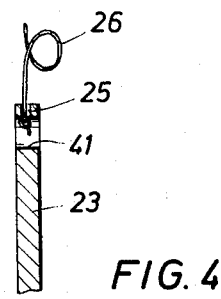
FIG. 4 is a fragmentary view somewhat similar to FIG. 3 but showing an alternative method of attaching the cutting lines to the rotating disc.

Referring now to FIG. 4, an alternate embodiment of the rotating disc or body of the invention will be described. A disc 23 is shown which is similar to disc 17. Disc 23 is also provided with a plurality of circumferential holes 24 which correspond with holes 18 of disc 17. However, each of the holes 24 communicates with another radial hole 25 at the periphery of disc 23. Cutting lines 26, of the same type as previously described, are attached to disc 23 by passage through holes 25 and are retained therein by a knotted end. In other words, FIG. 4 shows an alternate method of attaching the cutting lines to the rotating body, but the operation of the tool is otherwise the same.

Referring now to FIGS. 6–11, an alternative embodiment of the invention will be described, which embodiment provides means for paying out the cutting lines as the same become shortened through use.

Referring now specifically to FIGS. 6 and 7, a casing 28 is shown having mounted therein flexible drive shaft 29 which correspond respectively with casing 14 and shaft 20 of the previous embodiment. It is to be understood that drive shaft 29 is arranged for rotation by appropriate power means such as those shown in the FIG. 1 embodiment, so that casing 28 may be turned by the operator to change the cutting plane to horizontal, vertical, or otherwise, as required for the cutting job.

The lower end of drive shaft 29 is provided with a square end 30, which is arranged for insertion into a coupling 31 for rotation therewith. Coupling 31 is arranged for rotation in a power head generally designated by the numeral 32, which is arranged for attachment to the lower end of casing 28 as shown. These attaching means take the form of two oppositely spaced apart lobes 33 having screw holes therethrough and in which are mounted a pair of clamping screws 35. In addition, power head 32 is provided with a longitudinal slot 34 intermediate each of lobes 33 such that, upon tightening of clamping screws 35, power head 32 is frictionally attached to casing 28.

The lower end of power head 32 is provided with an enlarged flange 37 thereabout and with a central aperture therethrough in which is press mounted a pair of bushings 38 and 39.

The lower end of coupling 31 is arranged for threading engagement with drive shaft 40 which extends downwardly therefrom and is spaced from the lower end of coupling 31 by thrust washer 41. Shaft 40 extends downwardly through bushings 38 and 39 and is provided with an enlarged portion 42 which acts as a thrust bearing against lower bushing 39. Portion 42 has attached to the lower end thereof a thrust flange 43 and a lower extending portion 44 which extends downwardly therefrom and is arranged for threading engagement with metal insert 47 embedded in a rotary body generally designated by the numeral 48. Body 48 may be of a plastic or metal and is arranged for rotation by shaft 40 and is provided with cutting lines, which are to be described hereinafter.

Rotary body 48 is provided with cap 49 which is arranged for fitting over the top portion thereof and extending down about the sides thereof a substantial distance. Rotary body 48 is arranged for demounting from casing 28 by loosening clamping screws 35, which permits removal of power head 32 from casing 28 and separation of drive shaft 29 from coupling 31. Thereafter, shaft 40 can be removed from coupling 31 and power head 32 and, subsequently, unthreaded from rotary body 48, which permits removal of cap 49 and access to the interior of rotary body 48.

Body 48 is provided with a plurality of means for storing a supply of cutting lines therein, which cutting lines are arranged for paying out at predetermined times to vary the effective working lengths of the cutting lines.

Accordingly, body 48 is provided with a plurality of spool openings 50, each of which is spaced in a quadrant of rotary body 48 as shown in FIG. 8. Each of spool openings 50 is provided with a line exit channel 51 leading outwardly to the periphery of rotary body 48 as shown. The outward ends of exit channels 51 are curved or otherwise streamlined so as to provide a minimum of stress on the cutting lines which are extended radially outwardly therethrough. Spool openings 50 are of reduced diameter at the lower end thereof so as to provide a lower support flange 53 for supporting spool 52 thereabove. The purpose of these features will become apparent when it it is understood that effective cutting of vegetation requires that the body 48 be rotated at a velocity which produces relatively high tensile stresses in the lines 61. Since the lines 61 will tend to break at points where they have been "kinked" or otherwise angularly deformed, curvature of the outward ends of the exit channels 51 will prevent such kinkage from occurring at instances such as when the lines 61 are snapped about the periphery of the body 48.

Figure 11:
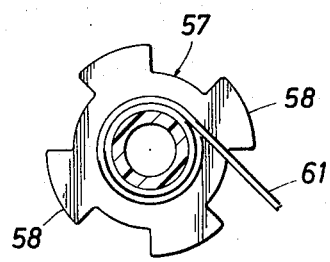
FIG. 11 is a sectional view taken along line 11—11 of FIG. 6 showing the bottom portion of the spool.

The upper side of support flange 53 is provided with a series of alternate recesses 54 and dogs 55 circumferentially thereabout which are arranged for mating with lower flange 57 of each of spools 52, as shown in FIG. 11. There it will be seen that each of lower flanges 57 is provided with four dogs 58 which are arranged to be received in recesses 54 in each of spool openings 50 to provide locking means to hold spools 52 against rotation relative to body 48.

Each of spools 52 is arranged for insertion into rotating body 48 from the top when cap 49 has been removed. In addition, each of spools 52 is urged downwardly in spool opening 50 by means of thrust spring 59 which is mounted below cap 49 and engages top flange 56 of each of spools 52. Hence, dogs 58 of spools 52 are urged into engagement with recesses 54 as described above. There is thus provided locking means which prevent rotation of each of spools 52 relative to rotating body 48.

In addition, each of spools 52 have wound thereon a supply of cutting line 61 of the aforesaid type, with the inward end projecting through an opening 60 provided in spool 52 through which one end of the cutting line 61 may be threaded and knotted as shown on the left side of FIG. 6. There is thus provided a supply of cutting lines 61 on each of spools 52. The opposite end of each of cutting lines 61 is arranged for paying out through a line exit channel 51 as shown in FIG. 8. Each of line exit channels 51 is provided with an elastomeric line retainer 62 which is press fitted in slot 63 such that line retainers 62 constantly bear against the protruding end of each of cutting lines 61. The resistance exerted by line retainers 62 is such that they can be overcome by pulling on line 61.

Thus, in order to adjust the effective working or cutting lengths of lines 61, the operator may push upwardly on bottom flange 57 of a spool 52, thereby clearing dogs 58 from recesses 54, at which point the operator can pull on the line 61, thereby extending the same and overcoming the normal resistance applied by the line retainer 62.

Each of spools 52 is also provided with additional means for adjusting the effective working length of each of cutting lines 61 and this takes the form of a plurality of turning knobs 64 which are attached to the bottom side of each of spool flanges 57. Thus, for example, if too much of lines 61 has been paid out, the operator can press upwardly on spool flanges 57, thereby clearing the locking means, and then grasping turning knobs 64 and taking up a supply of cutting line 61 sufficient to adjust the working lengths of each of the lines 61 to the desired length, as described above.

For the purpose of clarity, FIG. 8 is shown with two spools 52 having thrust springs 59 in position thereabove. Another one of spools 52, in the right quadrant as shown in FIG. 8, is shown with thrust spring 59 removed. In the lower quadrant as shown in FIG. 8, the spool has been removed from the spool opening 50.

In operation, the apparatus of the FIGS. 6–11 embodiment is assembled in the condition shown in FIG. 6, with cutting lines 61 extending generally radially outwardly therefrom to the desired lengths, which lengths are selected basis the aforesaid parameters described in connection with the previous embodiment. In addition, lines 61 will be of the same characteristics and parameters as described with respect to the cutting lines of the previous embodiment.

Thereafter, rotary body 48 is rotated by rotation of shaft 29 to the desired rotational speed, which will be on the same order as described in the previous embodiment. As a result, lines 61 will be extended radially outwardly from body 48 to the cutting plane, where cutting, lawn edging, or the like may be effected. As lines 61 become shortened through use, they can thereafter be lengthened by terminating rotation of rotary body 48, pressing upwardly on each of spools 52, and pulling on lines 61 to extend them to the desired distance. Thereafter, pressure is relieved on each of the spools and thrust springs 59 urge spools 52 back to the lock position, at which point cutting operations can be continued.

It will thus be apparent that this invention provides the art with an apparatus which can quickly, easily, and efficiently cut grass, weeds, and the like; over, under, around, and between rocks, culverts, and the like; and can cut around and between trees, posts, bushes, buildings, and other stationary objects, or the like. Further, this apparatus will be particularly safe for the operator in that the hazardous conditions prevalent in prior art apparatus has been essentially eliminated. By making the apparatus available in a portable embodiment, the cutting plane can be effected in any direction so as to accommodate both cutting and trimming operations as heretofore described, thereby eliminating the need for manual labor in certain difficult cutting operations.

The apparatus of this invention can be used successfully in yard trimming and cleaning operations where there is considerable debris, such as bottles, cans, papers, wood, wire and the like, without creating a dangerous condition in that the cutting elements of this device do not create missiles of such trash. Because of the nature of the cutting element of this invention, such objects are not thrown, but rather the cutting element acts in a resilient fashion in such a manner as not to impart sufficient force to such articles to become missiles; or if they are thrown, it is at a very low velocity relative to prior state of the art machines. Experience has shown that in operating an apparatus of this device with lines of the type described, the cutting lines may accidentally come in contact with the operator's shoes, articles of clothing, or the like, without serious injury as would be the case with prior art devices. Further, in the event a portion of the cutting line is thrown from the apparatus, such thrown portions possess low mass and low kinetic energy and, therefore, quickly loses velocity and energy, thus rendering the same virtually harmless.

Further modifications and alternative embodiments of the apparatus of this invention will be apparent to those skilled in the art in view of this description. Accordingly, this description is to be construed as illustrative only and is for the purpose of teaching those skilled in the art the manner of carrying out the invention. It is to be understood that the forms of the invention herewith shown and described are to be taken as the presently preferred embodiments. Various changes may be made in the shape, size and arrangement of parts. For example, equivalent elements or materials may be substituted for those illustrated and described herein, parts may be reversed, and certain features of the invention may be utilized independently of the use of other features, all as would be apparent to one skilled in the art after having the benefit of this description of the invention.

What is claimed is:

1. Apparatus for cutting vegetation comprising
a housing rotatable in a cutting plane about an axis and having at least one internal compartment spaced in said plane from said axis and a peripheral aperture communicating with said compartment and defined at least partially by a curvilinear wall portion of said housing, and
a flexible line member having a coiled portion stored in said compartment and having a non-coiled portion extending from said compartment through said aperture and outwardly of the periphery of said housing for arcuate travel in said plane,
said non-coiled portion of said line member extending across said curvilinear wall portion of said housing for support against angular deformation in said cutting plane during rotation of said housing and line member for cutting vegetation.

2. Apparatus for cutting vegetation, comprising
a generally circular housing rotatable about a centrally located axis to define a cutting plane perpendicularly related to said axis,
said housing having at least one internal compartment spaced in said plane from said axis and also having a peripheral aperture communicating with said compartment therein and defined at least partially by the surface of a curvilinear wall portion of said housing, and
a flexible non-metallic line member having a portion thereof coiled within said compartment and having the remainder thereof non-angularly extended in said plane within said housing through said aperture and peripherally from said housing to form a cutting flail during rotation of said housing,
said line member further having a portion of said remainder thereof also extending across said surface of said curvilinear wall portion of said housing for support against angular deformation in said cutting plane during rotation of said housing and line member for cutting vegetation.

3. The apparatus described in claim 2, wherein said surface of said curvilinear wall portion of said housing is located in said plane and is trailingly located on the periphery of said housing relative to rotation of said housing and said line member in said plane.

4. The apparatus described in claim 3, further including
storage means removably disposed in said housing for supporting in coiled arrangement the portion of said line member occupying said compartment and for non-angularly extending the remainder of said line member in said cutting plane and through said aperture in said housing.

5. The apparatus described in claim 4, wherein said storage means includes
a spool member removably disposed non-rotatably in said compartment for supporting in coiled fashion in said plane the portion of said line member occupying said compartment and for non-angularly extending the remainder of said line member in said plane and through said peripheral aperture.

6. Apparatus for cutting vegetation, comprising
a generally circular housing adapted to be rotated about a centrally located axis to define a cutting plane perpendicularly related to said axis and traversing said vegetation,
said housing having a plurality of internal compartments located in said plane and spaced about said axis and communicating with a related one of a corresponding plurality of spaced apart apertures located in the periphery of said housing and in said plane,
a corresponding plurality of spool members each removably disposed in a respective one of said compartments, and a corresponding plurality of flexible line members each partially wound about a respective one of said spool members and having its remainder extending non-angularly in said plane from said respective one of said compartments through said respective one of said apertures for arcuate travel in said cutting plane, said housing further having a rounded bearing surface at each aperture trailingly rotatable against said portion of said line member traversing said aperture for supporting said portion thereof against angular deformation in said plane during rotation of said housing and line member for cutting vegetation.

7. Apparatus for cutting vegetation comprising a disc-like rotatable housing means having a plurality of apertures spaced equidistantly about its peripheral edge and each formed by a pair of confronting spaced-apart curvilinear portions of said housing and a corresponding plurality of internal socket-like recesses located equidistantly about the rotation axis of said housing means and each communicating with one of said apertures therein, a corresponding plurality of spool-like members each insertably disposed in one of said recesses in said housing means, and a corresponding plurality of non-metallic line members each being wound about one of said spool-like members and each having a free end portion running through the respective one of said apertures and extending from the peripheral edge of said housing means a distance functionally related to the cross-sectional diameter of said line member, said free end portion of each of said line members being further supported against angular deformation in said cutting plane by said curvilinear portions of said housing during rotation of said housing and said line member for cutting vegetation.

8. The apparatus described in claim 7, further comprising a corresponding plurality of elastic stoppering means each arranged at one of said apertures of said housing means for urging the corresponding one of said line members into engagement with an adjacent surface of said housing means.

9. The apparatus described in claim 8, wherein said stoppering means are each arranged to permit unwinding of the line member corresponding thereto from the respective one of said spool members.

10. The apparatus described in claim 9, wherein said housing means further contains a corresponding plurality of passageways each extending from one of said recesses to the respective one of said apertures and each enclosing a part of the free end portion of one of said line members, said passageways each having at least one wall portion outwardly curving to the respective one of said apertures for bearing said part of said one line member during rotation of said housing member and line member in said plane for cutting vegetation.

* * * * *